(12) United States Patent
Zhu

(10) Patent No.: US 12,147,685 B1
(45) Date of Patent: Nov. 19, 2024

(54) METHODS AND APPARATUS FOR PROVIDING A LOW-POWER MEMORY BLOCK USING A PAIR OF NVM CELLS

(71) Applicant: GOWIN Semiconductor Corporation, Guangzhou (CN)

(72) Inventor: Jinghui Zhu, San Jose, CA (US)

(73) Assignee: GOWIN Semiconductor Corporation, GuangZhou (CN)

( * ) Notice: Subject to any disclaimer, the term of this patent is extended or adjusted under 35 U.S.C. 154(b) by 0 days.

(21) Appl. No.: 18/206,082

(22) Filed: Jun. 6, 2023

Related U.S. Application Data

(60) Provisional application No. 63/349,570, filed on Jun. 6, 2022.

(51) Int. Cl.
*G06F 12/00* (2006.01)
*G06F 3/06* (2006.01)

(52) U.S. Cl.
CPC ............ *G06F 3/0625* (2013.01); *G06F 3/064* (2013.01); *G06F 3/0679* (2013.01)

(58) Field of Classification Search
CPC ...... G06F 3/0625; G06F 3/064; G06F 3/0679; G06F 12/0238; G11C 7/18; G11C 29/52; G11C 16/28; G11C 16/0441; G11C 11/5642; G11C 16/26

See application file for complete search history.

(56) References Cited

U.S. PATENT DOCUMENTS

2015/0212880 A1\* 7/2015 Carissimi ................. G11C 7/18
714/764

\* cited by examiner

*Primary Examiner* — Shawn X Gu
(74) *Attorney, Agent, or Firm* — JW Law Group; James M. Wu

(57) ABSTRACT

A semiconductor device provides logic operations utilizing low-power memory blocks ("LMBs") for power conservation. An LMB, in one embodiment, includes a first nonvolatile memory ("NVM"), a second NVM cell, and an LMB output terminal. The first NVM cell contains an NVM transistor able to store one (1) bit of first value persistently. The second NVM cell is configured to persistently store one (1) bit of second value which is opposite logic value of the first value. The LMB output terminal, coupled to a drain terminal of first NVM cell and a source terminal of second NVM cell, is operable to provide an output value in accordance with the first value.

20 Claims, 10 Drawing Sheets

METHODS AND APPARATUS FOR PROVIDING A LOW-POWER MEMORY BLOCK USING A PAIR OF NVM CELLS

PRIORITY

This application claims the benefit of priority based upon U.S. Provisional Patent Application Ser. No. 63/349,570, filed on Jun. 6, 2021 in the name of the same inventor and entitled "Method and System for Providing Software Defined Microcontroller Unit," the disclosure of which is hereby incorporated into the present application by reference.

FIELD

The exemplary embodiment(s) of the present application relates to the field of programmable semiconductor devices for logic operations involving in the computer hardware and software. More specifically, the exemplary embodiment(s) of the present invention relates to low-power memory cells for power conservation.

BACKGROUND

With increasing popularity of digital computations, network communications, artificial intelligence (AI), IoT (Internet of Things), and/or robotic controls, there is an increasing demand for fast, flexible, and efficient hardware and/or semiconductor devices with processing capabilities. Thus, high-speed and flexible semiconductor chips are generally more desirable. One conventional approach to satisfy this demand is the use of dedicated custom integrated circuits and/or application-specific integrated circuits ("ASICs"). However, a notable shortcoming of the ASIC approach is that it lacks flexibility and consumes a large number of resources.

An increasingly popular alternative approach is the utilization of programmable semiconductor devices ("PSDs") such as programmable logic devices ("PLDs") or field-programmable gate arrays ("FPGAs"). A feature of PSD is that it allows an end-user to program and/or reprogram one or more desirable functions to suit a variety of diverse applications after the PSDs are fabricated.

A drawback, associated with a conventional PSD as well as ASIC chips is their relatively large power consumption. For example, leakage current or a small amount of current in a conventional memory cell constantly flows through its transistors even when the memory cell is not active.

SUMMARY

A semiconductor device, in one embodiment, is able to provide logic and/or memory operations utilizing low-power memory blocks ("LMBs") for power conservation. Each LMB, in one aspect, is configured to use two nonvolatile memory ("NVM") cells for one logic value. For example, an LMB includes a first NVM, a second NVM cell, and an LMB output terminal. The first NVM cell contains an NVM transistor able to store one (1) bit of first value persistently. The second NVM cell is configured to persistently store one (1) bit of second value which is opposite logic value of the first value. The LMB output terminal, coupled to a drain terminal of first NVM cell and a source terminal of second NVM cell, is operable to provide an output value in accordance with the first value with minimal power consumption.

Additional features and benefits of the exemplary embodiment(s) of the present invention will become apparent from the detailed description, figures, and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
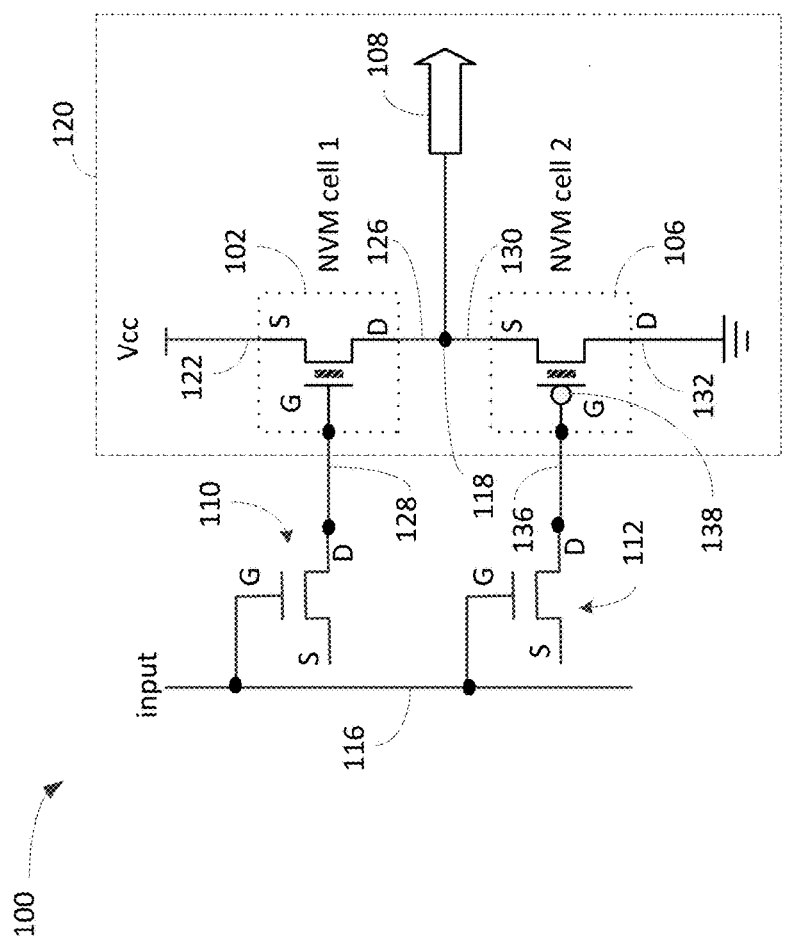
FIG. 1 is a block diagram illustrating a circuit containing low-power memory block ("LMB") for storing one bit information using two NVM cells in in accordance with one embodiment of the present invention.

Embodiments of the present invention disclose a method(s) and/or apparatus for providing a low-power memory block ("LMB") using dual nonvolatile memory ("NVM") cells for power conservation.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations included herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that although such a development effort might be complex and time-consuming, it would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all components of a given apparatus (e.g., device) or method. The same reference indicators will be used throughout the drawings and the following detailed description to refer to the same or like parts.

In accordance with the embodiment(s) of the present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field-programmable gate arrays (FPGAs), application-specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, it may be stored on a tangible medium such as a computer memory device, such as but not limited to, magnetoresistive random access memory ("MRAM"), phase-change memory, or ferroelectric RAM ("FeRAM"), flash memory, resistive random-access memory ("ReRAM" or "RRAM"), conductive-bridging RAM ("CBRAM"), ROM (Read Only Memory), PROM (Programmable Read-Only Memory), EEPROM (Electrically Erasable Programmable Read-Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instructions wherein the computer refers to one or a cluster of computers, personal computers, workstations, mainframes, or combinations of computers thereof.

A semiconductor device, in one embodiment, can provide logic and/or memory operations utilizing low-power memory blocks ("LMBs") for power conservation. Each LMB, in one aspect, is configured to use two nonvolatile memory ("NVM") cells for one logic value. For example, an LMB includes a first NVM, a second NVM cell, and an LMB output terminal. The first NVM cell contains an NVM transistor able to store one (1) bit of first value persistently. The second NVM cell is configured to persistently store one (1) bit of second value which is opposite logic value of the first value. The LMB output terminal, coupled to a drain terminal of first NVM cell and a source terminal of second NVM cell, is operable to provide an output value in accordance with the first value with minimal power consumption.

Alternatively, LMBs can be used in a programmable semiconductor devices ("PSDs") such as FPGA or PLD for reducing power consumption. For example, PSD includes an array of LMBs for storing configuration data. Alternatively, LMBs can also be programmed or configured to be used for storing user data during logic operations. In one aspect, LMB includes a first NVM cell and a second NVM cell configured to storage one logic value. The first NVM cell, for example, is a flash-based transistor able to store one (1) bit of data persistently. The second NVM cell containing a second flash-based transistor is able to persistently store one (1) bit of data which stores a digital value having opposite logic value of digital value in the first NVM cell.

FIG. 1 is a block diagram 100 illustrating a circuit containing LMB for storing one bit information using two NVM cells in accordance with one embodiment of the present invention. Diagram 100 includes input line 116, LMB 120, and two input transistors 110-112. It should be noted that the underlying concept of the exemplary embodiment(s) of the present invention would not change if one or more blocks (circuit or elements) were added to or removed from diagram 100.

LMB 120, in one embodiment, includes an NVM cell 102, NVM cell 106, and output terminal 108. NVM cell 102 includes a source ("S") terminal 122 connecting to a power supply such as Vcc (voltage common collector), gate ("G") terminal 128, and drain ("D") terminal 126 coupling to a node 118. NVM cell 106 includes an S terminal 132 connecting to node 118, G terminal 136, and D terminal 132 coupling to a power supply such as GND (ground). Output terminal 108 is coupled to node 118 for providing an output of LMB 120.

G terminal 128 is coupled to D terminal of transistor 110 while G terminal of transistor 110 is connected to input line 116 for receiving input signals. G terminal 136 is coupled to D terminal of transistor 112 and G terminal of transistor 112 is connected to input line 116 for receiving input signals. It should be noted that even though G terminals 128 and 136 are driven by similar or same input signals, the input values to NVM cell 102 and NVM cell 106 are opposite logic values due to an inversion function as indicated by numeral 138.

NVM cells 102-106 are digital storage components capable of storing or retaining stored data even when the power supply is removed or disconnected. NVM cells 102-106 can be constructed via flash memory, ferroelectric RAM ("F-RAM"), magnetoresistive RAM ("MRAM"), Phase-change Memory ("PCM"), or a combination of flash, F-Ram, MRAM, and/or PCM. It should be noted that flash memory is a solid-state chip that maintains stored data without any external power source. Flash memory devices use two different technologies—NOR and NAND—to map data. NOR flash provides high-speed random access, reading and writing data in specific memory locations. NAND flash reads and writes sequentially at high speed, handling data in blocks, however it is slower on read when compared to NOR.

Ferroelectric RAM ("FeRAM, F-RAM or FRAM") is a form of random-access memory using a capacitor and transistor. An F-RAM cell contains a thin ferroelectric film of lead zirconate titanate for changing [Pb(Zr,Ti)O$_3$] or PZT polarity in an electric field. Due to the PZT (lead zirconate titanate) crystal maintaining polarity, F-RAM retains its data memory when power is shut off or interrupted. Due to the crystal structure and how it is influenced, F-RAM offers distinct properties from other nonvolatile memory options, including extremely high, although not infinite, endurance (exceeding $10^{16}$ read/write cycles for 3.3 V devices), ultra low-power consumption (since F-RAM does not require a charge pump like other non-volatile memories), single-cycle write speeds, and gamma radiation tolerance.

MRAM stores data in magnetic storage elements called magnetic tunnel junctions (MTJs). For example, Thermal-assisted switching (TAS) type of MRAM is used for storing data. PCM stores data in chalcogenide glass, which can reversibly change the phase between the amorphous and the crystalline state, accomplished by heating and cooling of the glass. The crystalline state has low resistance and the amorphous phase has high resistance, which allow currents to be switched ON and OFF to represent digital "1" and "0" states. ReRAM or RRAM provides persistence memory storage by changing the resistance across a dielectric solid-state material, also known as a memristor.

It should be noted that Conductive bridging random access memory ("CBRAM") is another type of NVM capable of storing digital information persistently through a process of dissolving ions in electrolyte material.

LMB 120, in one example, includes a pair of NVM cells 102-106 wherein both NVM cells are used to store one (1) bit value, logic value, or digital information. LMB such as LMB 120, for example, contains NVM cells using dual or pair NVM devices. During an operation, if NVM cell 102 stores a logic "1" value, NVM cell 102 is logic "on" as a transistor function whereby NVM cell 102 pulls node 118 to logic "1" value via Vcc. If NVM cell 102 is logic "on", NVM cell 106 is set to logic "off" due to its stored logic "0" value. Since NVM cell 106 is in logic "off" or "open" status maintained by NVM cell 106, the leakage current or current loss between NVM cells 102 to NVM cells 106 is minimized.

A semiconductor device, chip, or die using LMB 120 for power conservation includes a first NVM cell or NVM cell 102, second NVM cell or NVM cell 106, and an LMB output terminal or output terminal 108. The first NVM cell is configured to contain an NVM transistor able to store one (1) bit of first value persistently. In one example, the first NVM cell can be a flash-based transistor, MRAM based transistor, PCM based transistor, FeRAM based transistor, RRAM based transistor, or CBRAM based transistor able for storing data persistently. The second NVM cell is configured to persistently store one (1) bit of second value which is opposite logic value of the first value. The second NVM cell can be a flash-based transistor, MRAM based transistor, PCM based transistor, FeRAM based transistor, RRAM based transistor, or CBRAM based transistor for storing data persistently. The LMB output terminal, coupling to a drain terminal of first NVM cell and a source terminal of second NVM cell, is configured to provide an output value in accordance with the first value.

In one embodiment, the semiconductor device also includes an FPGA containing configurable logic blocks ("LBs") wherein the configurable LBs can be selectively programmed to perform user defined one or more logic functions. It should be noted that configurable LBs using its LMBs to store configuration data for programming at least a portion of the configurable LBs. In one example, a system or computing system uses LMBs to provide various digital processing functions and/or network communications.

An advantage of using an LMB to store one bit information is to achieve power conservation especially in FPGA and/or PLD devices. For example, since each FPGA device requires large number of memory cells, substituting LMB for each traditional six-transistor memory cell can reduce overall leakage current. The LMB such as LMB 120 can also be used to replace 1-transistor 1-resistor (1T1R) memory cell for facilitating low-power operations.

Figure 2:
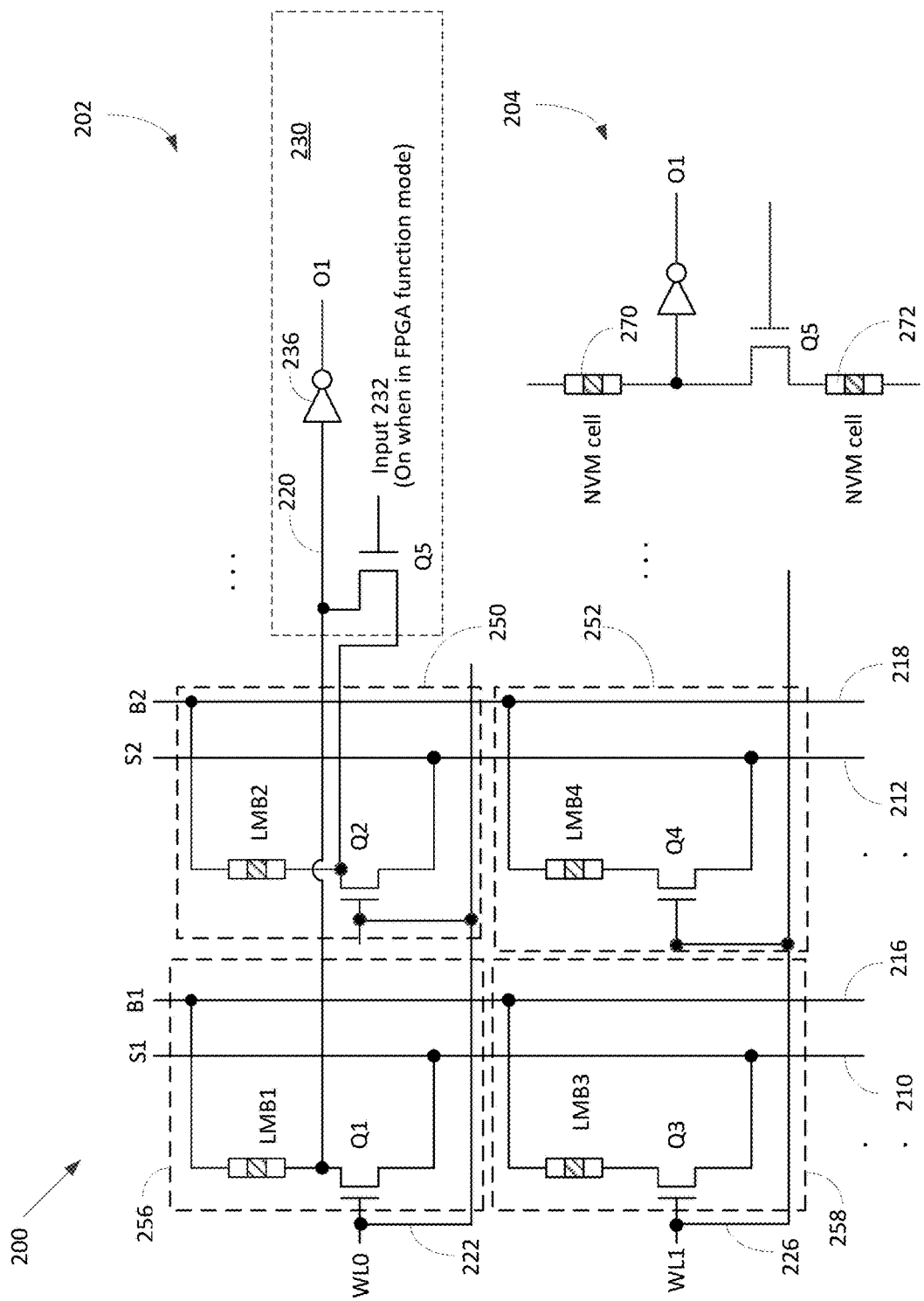
FIG. 2 is a block diagram illustrating an alternative embodiment of LMB used in an array of memory storage with low-power operations in accordance with one embodiment of the present invention.

FIG. 2 is a block diagram 200 illustrating an embodiment of LMB used in an array of memory storage with low-power operations in accordance with one embodiment of the present invention. Diagram 200 illustrates LMB 202 and LMB 204 wherein LMB 202 shows an array of memory using various NVM cells such as LMB1-LMB4 used in FPGA for storing digital information such as configuration data for low-power operations. LMB 204 illustrates a simplified version of a logic illustration having a similar output as LMB 202. It should be noted that the underlying concept of the exemplary embodiment(s) of the present invention would not change if one or more blocks (circuit or elements) were added to or removed from diagram 200.

LMB 202, which represents a memory array, includes four (4) cell blocks 250-258, select lines (S1, S2 . . . ) 210-212, word lines (WL0, WL1, . . . ) 222-226, and bit lines (B1, B2 . . . ) 216-218, and an output block 230. Cell blocks 250-258 include LMBs and transistors Q1-Q4 wherein transistors Q1-Q4 are used to handle word lines such as WLs 222-226 as well as select lines 210-212. Each of LMB1-LMB4, in one embodiment, includes dual or a pair of NVM cells wherein each pair of NBM cells are used for storing one logic value. Bit lines 216-218, in one example, are configured to couple to terminals of LMBs such as LMB1-LMB4.

Output block 230 includes a transistor Q5 and invertor 236, wherein transistor Q5 is configured to receive input 232. In one embodiment, input 232 is logic active or "on" indicating FPGA functional mode. The input terminal of invertor 236 is coupled to word line 222 and the output terminal of invertor 236 provides an output O1. Depending on the applications, multiple output blocks such as output block 230 are required for handling multiple word lines as well as bit lines.

LMB 204 is a logic illustration used in one or more cell blocks such as cell blocks 250 and 256 having an output terminal O1. LMB 204 includes NVM cells 270-272 capable of providing a low-power operation for an FPGA chip or die using two NVM cells to maintain one logic value. In one example, transistor Q5 of LMB 204 is used to control or manage the FPGA modes such as configuration mode or user data mode.

In operation, transistor Q5 of LMB 202 is used to facilitate the management of FPGA functions. During a mode of configuration, output O1 provide an output value based on designated or configured LMB(s) such as LMB 250. In one aspect, word lines 222-226, select lines 210-212, and bit lines 216-218 are used for configuring or programming LMBs such as LMB1-LMB4. After programming LMBs such as LMB1-LMB2, the word lines such as WL0 222 and WL1 226 are set to be inactive or logic zero so that transistors Q1-Q4 will be off. Accordingly, the stored values in LMBs such as LMB1-LMB4 control the output of LMBs. When LMB1-LMB2, for instance, containing transistors Q2 and Q4 are turned off, LMB2 and LMB4 decide the output value of LMBs.

An advantage of using LMBs is to minimize leakage current which conserves the power consumption of FPGA.

Figure 3:
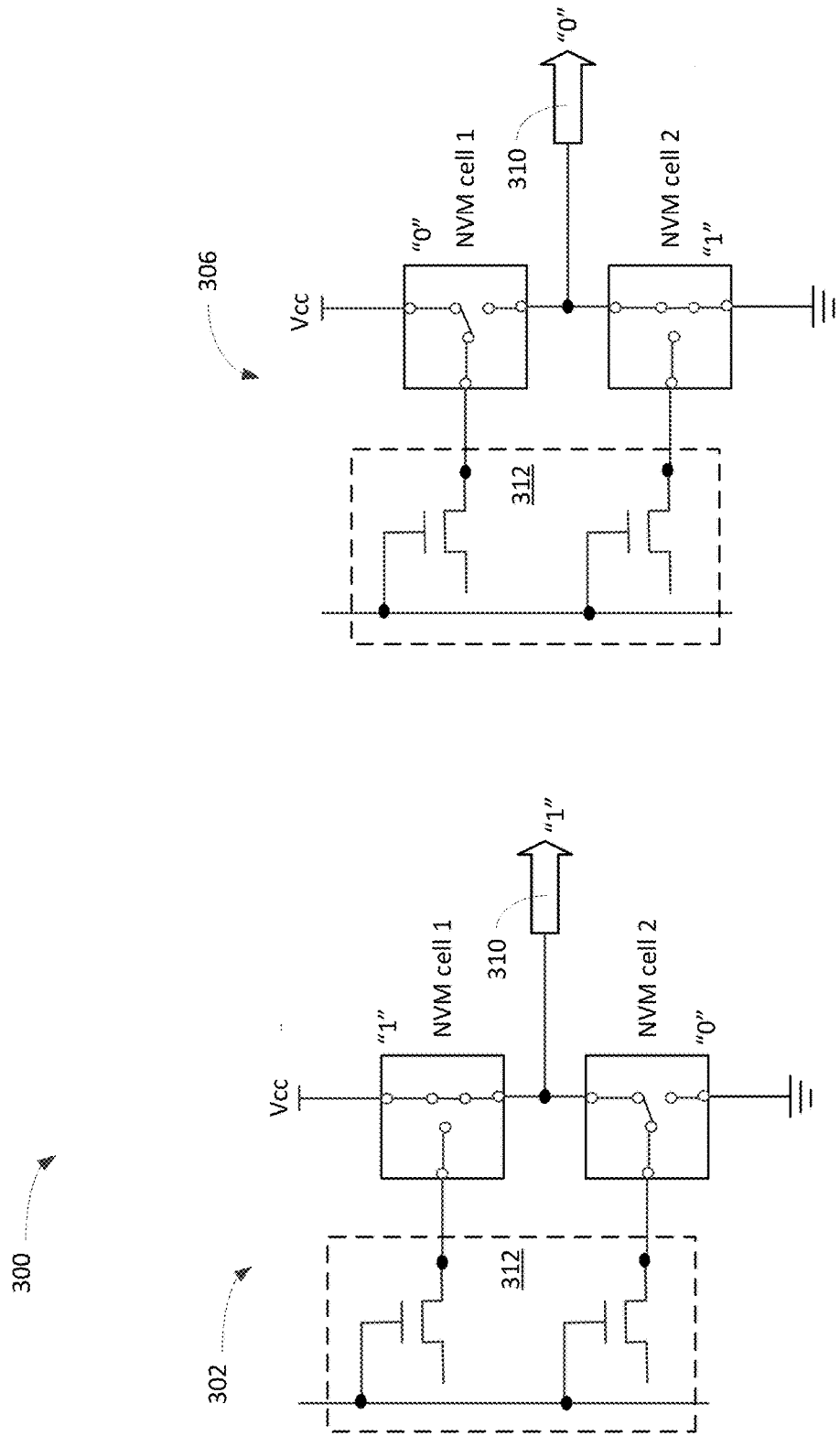
FIG. 3 illustrates embodiments of logic operations of LMB using a pair of NVM cells in accordance with one embodiment of the present invention.

FIG. 3 illustrates embodiments of logic operations of LMB using a pair of NVM cells in accordance with one embodiment of the present invention. LMB 302 or 306 includes NVM cell 1, NVM cell 2, and an output terminal 310. LMB 302 or 306, in one example, is coupled to a control circuit 312 for managing LMB 302 or 306. A function of LMB 302 is to provide and maintaining an output value with minimal power loss. It should be noted that the underlying concept of the exemplary embodiment(s)

of the present invention would not change if one or more blocks (circuit or elements) were added to or removed from diagram 300.

A process of facilitating a cell block containing LMB 302 for outputting and/or maintaining a logic value includes storing a logic one (1) value to a first NVM device or NVM cell 1 wherein one terminal of the first NVM device such as the source terminal of NVM cell 1 is coupled to Vcc and another terminal of the first NVM device such as the drain terminal of NVM cell 1 is coupled to an output terminal of the NVM block such as output terminal 310. A logic zero (0) value is stored to a second NVM device such as NVM cell 2. One terminal of the second NVM device such as the drain terminal of NVM cell 2 is coupled to a ground voltage ("GND") and another terminal of the second NVM device such as the source terminal of NVM cell 2 is coupled to the output terminal such as output terminal 310. The process provides a logic one (1) output value at the output terminal of the NVM block such as output terminal 310 with approximately zero current flowing through from the first NVM device to the second NVM device. In one embodiment, the process is implemented for storing configuration data to various NVM blocks for configuring FPGA.

In an alternative embodiment, a process of facilitating a cell block containing LMB 306 for outputting or maintaining a logic value includes storing a logic zero (0) value to a first NVM device such as NVM cell 1 wherein one terminal of the first NVM device such as the source terminal of NVM cell 1 is coupled to Vcc and another terminal of the first NVM device such as the drain terminal of NVM cell 1 is coupled to an output terminal of the dual NVM block such as output terminal 310. A logic one (1) value is concurrently stored to a second NVM device such as NVM cell 2 wherein one terminal of the second NVM device such as the drain terminal of NVM cell 2 is coupled to a ground voltage ("GND") and another terminal of the second NVM device such as the source terminal of NVM cell 2 is coupled to the output terminal such as output terminal 310. The process is capable of providing a logic zero (0) output value at the output terminal of the NVM block such as output terminal 310 with approximately zero current flowing through from the first NVM device to the second NVM device.

An advantage of using LMB is to allow cell blocks or LMBs using dual or a pair of NVM cells for each logic value for power conservation in FPGA operation.

Figure 4:
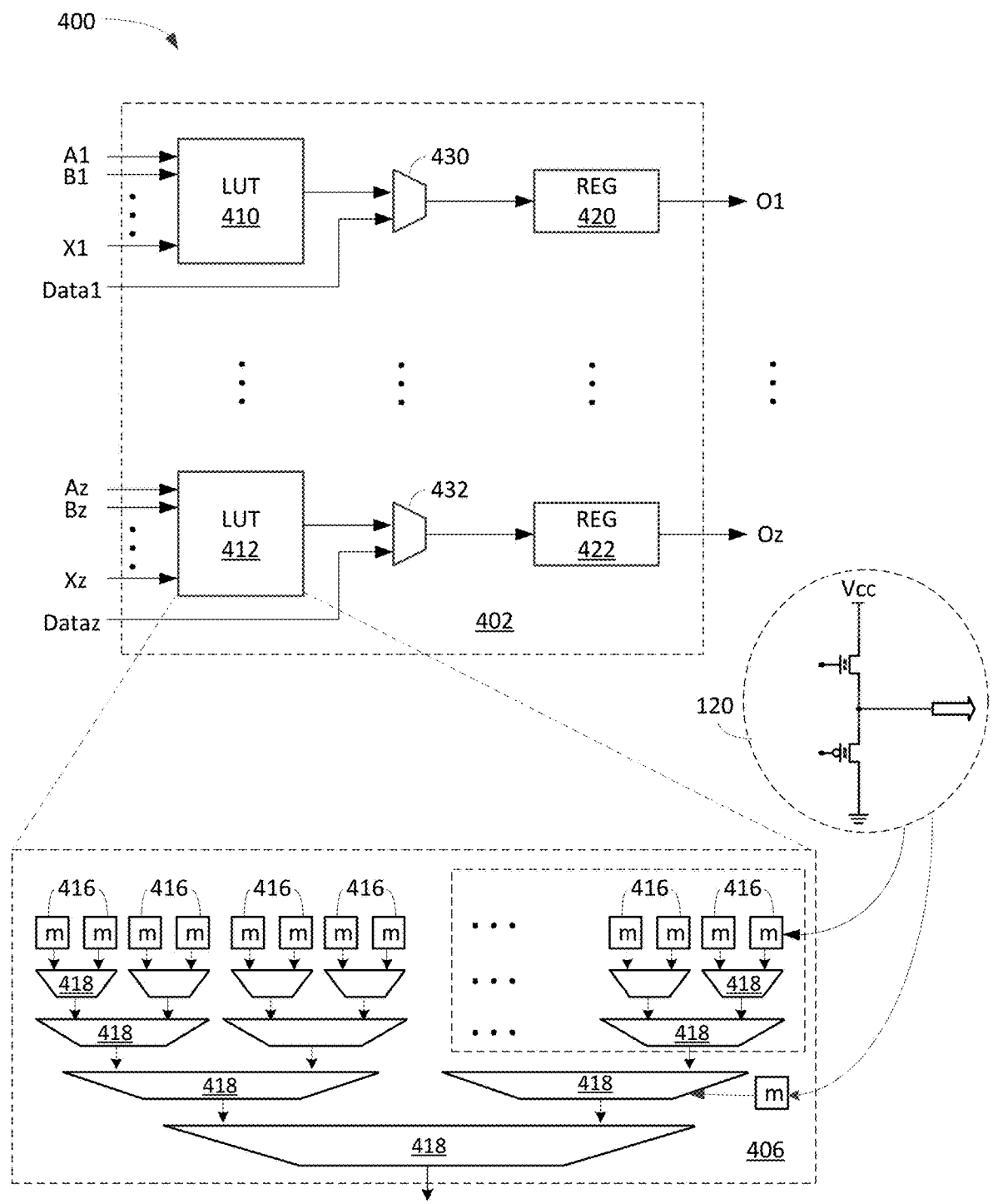
FIG. 4 is a block diagram illustrating a programmable logic block ("LAB") 402 containing LMBs based logic lookup table ("LUT") for power conservation in accordance with one embodiment of the present invention.

FIG. 4 is a block diagram 400 illustrating a programmable logic block ("LAB") 402 containing LMBs based logic lookup table ("LUT") in accordance with one embodiment of the present invention. LAB 402 includes multiple LUTs 410-412, routing multiplexers 430-432, and registers 420-422. Each LUT receives a set of inputs and generates an output based on the inputs as well as functional configuration. For example, LUT 410 receives input data from terminals A1, B1, . . . . X1, and generates an output O1 based on the input data as well as configuration value associated with LUT 410. It should be noted that the underlying concept of the exemplary embodiment(s) of the present invention would not change if one or more blocks (circuit or elements) were added to or removed from diagram 400.

IC component diagram 406 is an exploded-view of LUT 412 showing multiple memory bits, cells or units 416 and multiplexers 418 to form a configurable LUT. It should be noted that LUT 412 can have, for example, 2, 3, 4, 6, 8, 15, or 32 inputs LUT. LMB 120, in one embodiment, is used for memory bits 416 for power conservation.

Depending on the applications, a large portion of LABs in PSD or FPGA can be idling (or not used) after configuration. Since each LAB contains an array of LMB based memory bits, the LAB(s) can be reconfigured to be a user memory. A random accessible LMB based memory can be configured as a user memory for power conservation.

An advantage of using LMB based LUTs is that the LUTs can remember the configured information persistently with minimal power loss until they are reprogrammed.

Programmable Semiconductor Device (PSD)

Figure 5:
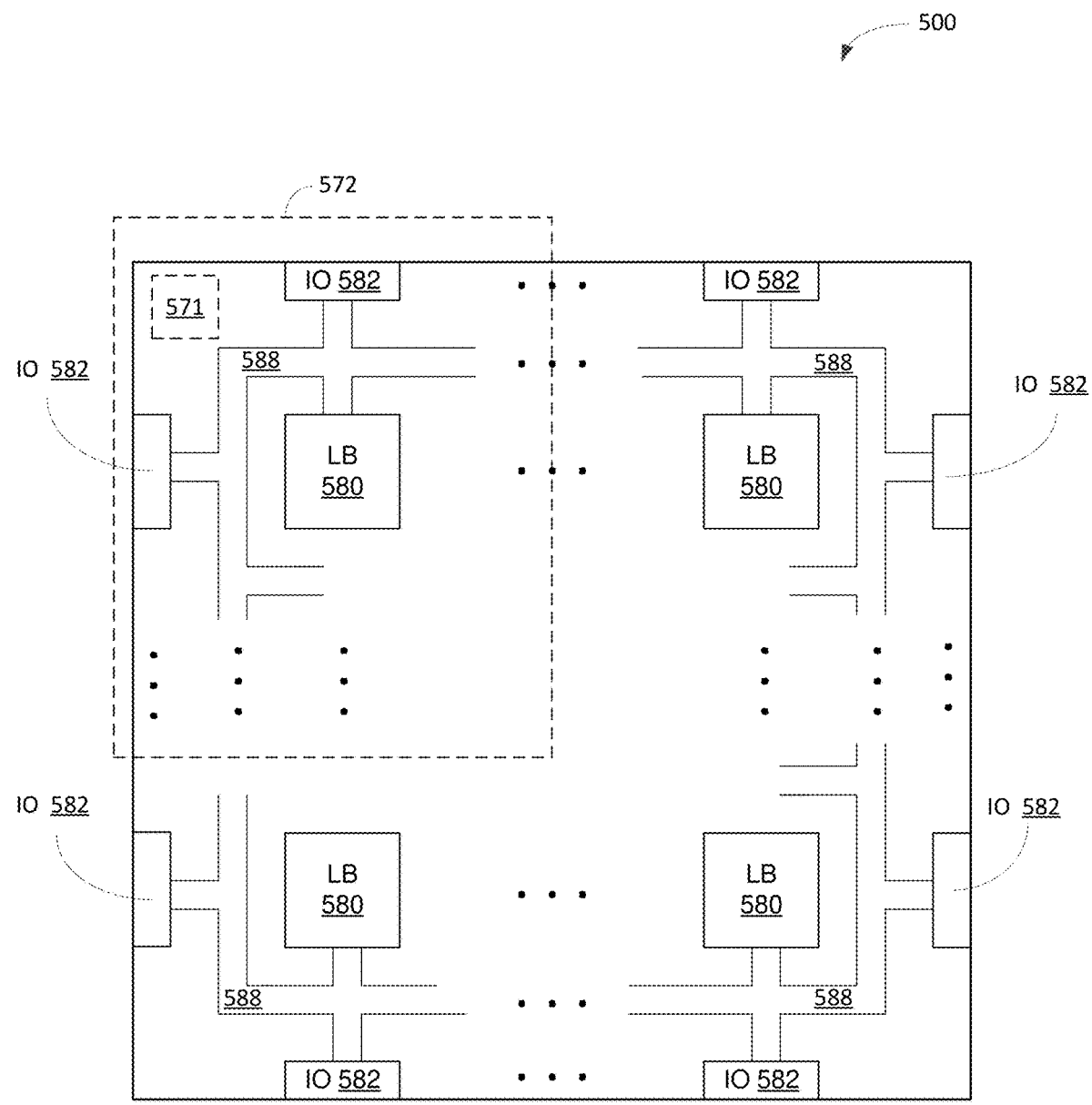
FIGS. 5-7 are block diagrams illustrating a programmable semiconductor device ("PSD") or FPGA using LMBs in accordance with one embodiment of the present invention.

FIG. 5 is a block diagram 500 illustrating a programmable semiconductor device ("PSD") or FPGA able to facilitate execution of user defined logic operations in accordance with one embodiment of the present invention. PSD, also known as FPGA, PIC, and/or a type of Programmable Logic Device ("PLD"), employs LMB based memory 571 and operations for achieving low-power operations. It should be noted that the underlying concept of the exemplary embodiment(s) of the present invention would not change if one or more blocks (circuit or elements) were added to or removed from diagram 500.

PSD includes an array of configurable LBs 580 surrounded by input/output blocks ("IOs") 582, and programmable interconnect resources 588 ("PIR") that include vertical interconnections and horizontal interconnections extending between the rows and columns of LBs 580 and IO 582. PRI 588 may further include interconnecting array decoders ("IAD") or programmable interconnection array ("PIA"). It should be noted that the terms PRI, IAD, and PIA may be used interchangeably hereinafter.

Each LB, in one example, includes programmable combinational circuitry and selectable output registers programmed to implement at least a portion of a user's logic function. The programmable interconnections, connections, or channels of interconnect resources are configured using various switches to generate signal paths between the LBs 580 for performing logic functions. Each IO 582 is programmable to selectively use an IO pin (not shown) of PSD.

PIC, in one embodiment, can be divided into multiple programmable partitioned regions ("PPRs") 572 wherein each PPR 572 includes a portion of LBs 580, some PPRs 588, and IOs 582. A benefit of organizing PIC into multiple PPRs 572 is to optimize management of storage capacity, power supply, and/or network transmission.

Bitstream of configuration data is a binary sequence (or a file) containing programming information or data for a PIC, FPGA, or PLD. The bitstream is created to reflect the user's logic functions together with certain controlling information. For an FPGA or PLD to function properly, at least a portion of the registers or flipflops in FPGA needs to be programmed or configured before it can function. It should be noted that bitstream is used as input configuration data to FPGA.

Figure 6:
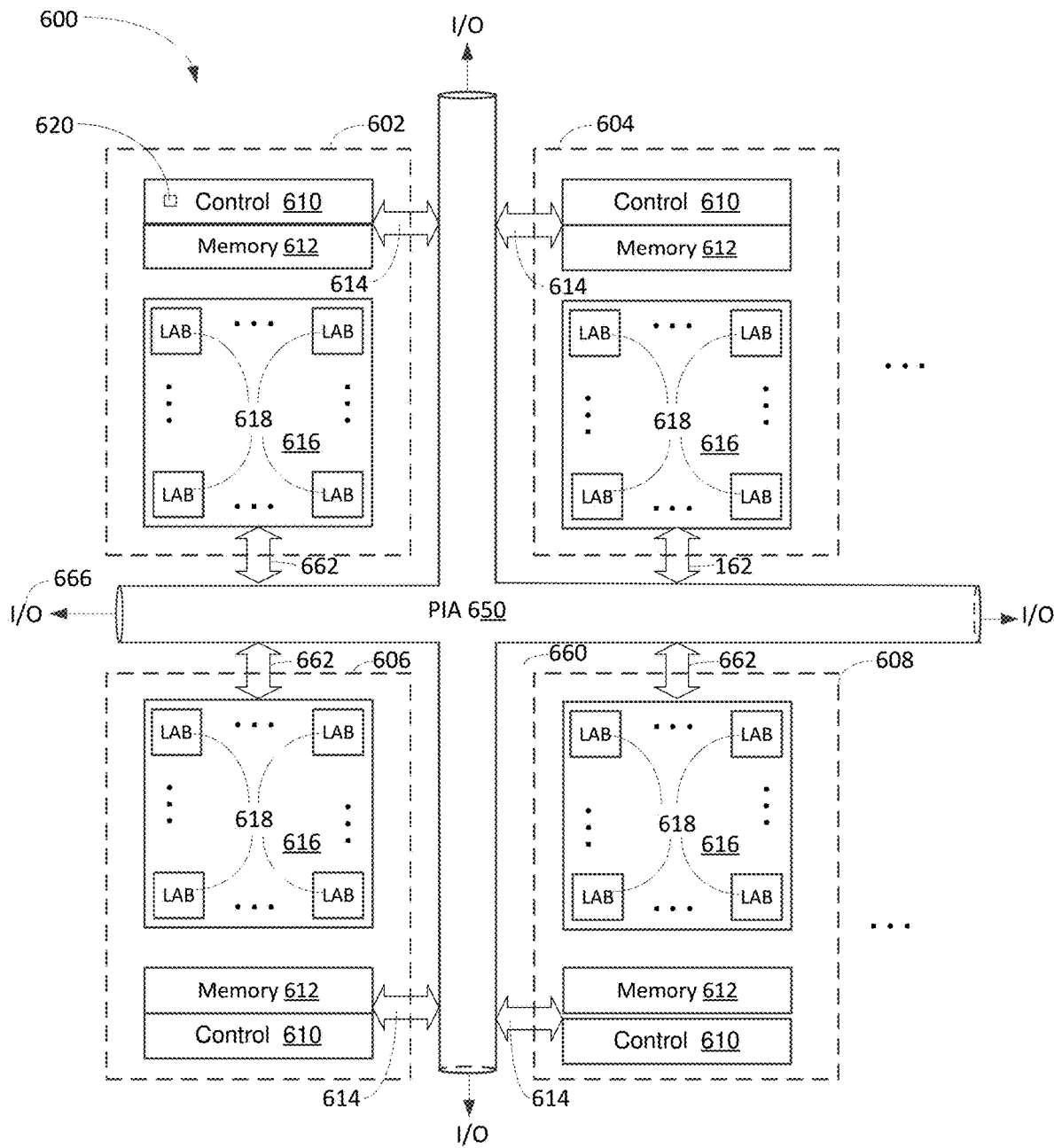

FIG. 6 is a block diagram illustrating a PSD operable to carry out various user-defined logic operations using LMB based memory cells 620 in accordance with one embodiment of the present invention. To simplify the foregoing discussion, the terms "PSD", "PIC", FPGA, and PLD are referring the same or similar devices and they can be used interchangeably hereinafter. Diagram 600 includes multiple PPRs 602-608, PIA 650, and regional IO ports 666. PPRs 602-608 further includes control units 610, memory 612, and LBs 616. Note that control units 610 can be configured into one single control unit, and similarly, memory 612 can also be configured into one single memory for storing configurations. It should be noted that the underlying concept of the exemplary embodiment(s) of the present invention would not change if one or more blocks (circuit or elements) were added to or removed from diagram 600.

LBs 616, also known as configurable function unit ("CFU") include multiple logic array blocks ("LABs") 618 which is also known as a configurable logic unit ("CLU"). Each LAB 616, for example, can be further organized to include, among other circuits, a set of programmable logical elements ("LEs"), configurable logic slices ("CLS"), or macrocells, not shown in FIG. 6. Each LAB, in one example, may include anywhere from 32 to 612 programmable LEs. IO pins (not shown in FIG. 6), LABs, and LEs are linked by PIA 650 and/or other buses, such as buses 662 or 614, for facilitating communication between PIA 650 and PPRs 602-608.

Each LE includes programmable circuits such as the product-term matrix, lookup tables, and/or registers. LE is also known as a cell, configurable logic block ("CLB"), slice, CFU, macrocell, and the like. Each LE can be independently configured to perform sequential and/or combinatorial logic operation(s). It should be noted that the underlying concept of PSD would not change if one or more blocks and/or circuits were added or removed from PSD.

Control units 610, also known as configuration logics, can be a single control unit. Control unit 610, for instance, manages and/or configures individual LE in LAB 618 based on the configuring information stored in memory 612. It should be noted that some IO ports or IO pins are configurable so that they can be configured as input pins and/or output pins. Some IO pins are programmed as bi-directional IO pins while other IO pins are programmed as unidirectional IO pins. The control units such as unit 610 are used to handle and/or manage PSD operations in accordance with system clock signals.

LBs 616 include multiple LABs that can be programmed by the end-user(s). Each LAB contains multiple LEs wherein each LE further includes one or more lookup tables ("LUTs") as well as one or more registers (or D flip-flops or latches). Depending on the applications, LEs can be configured to perform user-specific functions based on a predefined functional library facilitated by the configuration software. PSD, in some applications, also includes a set fixed circuit for performing specific functions. For example, the fixed circuits include, but not limited to, a processor(s), a DSP (digital signal processing) unit(s), a wireless transceiver(s), and so forth.

PIA 650 is coupled to LBs 616 via various internal buses such as buses 614 or 662. In some embodiments, buses 614 or 662 are part of PIA 650. Each bus includes channels or wires for transmitting signals. It should be noted that the terms channel, routing channel, wire, bus, connection, and interconnection are referred to as the same or similar connections and will be used interchangeably herein. PIA 650 can also be used to receive and/or transmits data directly or indirectly from/to other devices via IO pins and LABs.

Memory 612 may include multiple storage units situated across a PPR. Alternatively, memories 612 can be combined into one single memory unit in PSD. In one embodiment, memory 612 is an NVM storage unit used for both configuration and user memory. The NVM storage unit can be, but not limited to, MRAM, flash, Ferroelectric RAM, and/or phase changing memory (or chalcogenide RAM). Depending on the applications, a portion of the memory 612 can be designated, allocated, or configured to be a block RAM ("BRAM") used for storing large amounts of data in PSD.

A PSD includes many programmable or configurable LBs 616 that are interconnected by PIA 650, wherein each programmable LB is further divided into multiple LABs 618. Each LAB 618 further includes many LUTs, multiplexers and/or registers. During configuration, a user programs a truth table for each LUT to implement a desired logical function. For example, a four-input (16 bit) LUT receives LUT inputs from a routing structure (not shown in FIG. 6). Based upon the truth table programmed into LUT during configuration of PSD, a combinatorial output is generated via a programmed truth table of LUT in accordance with the logic values of LUT inputs. The combinatorial output is subsequently latched or buffered in a register or flip-flop before the clock cycle ends.

In one embodiment, control unit 610 includes a configuration logic or memory using LMB 620.

Figure 7:
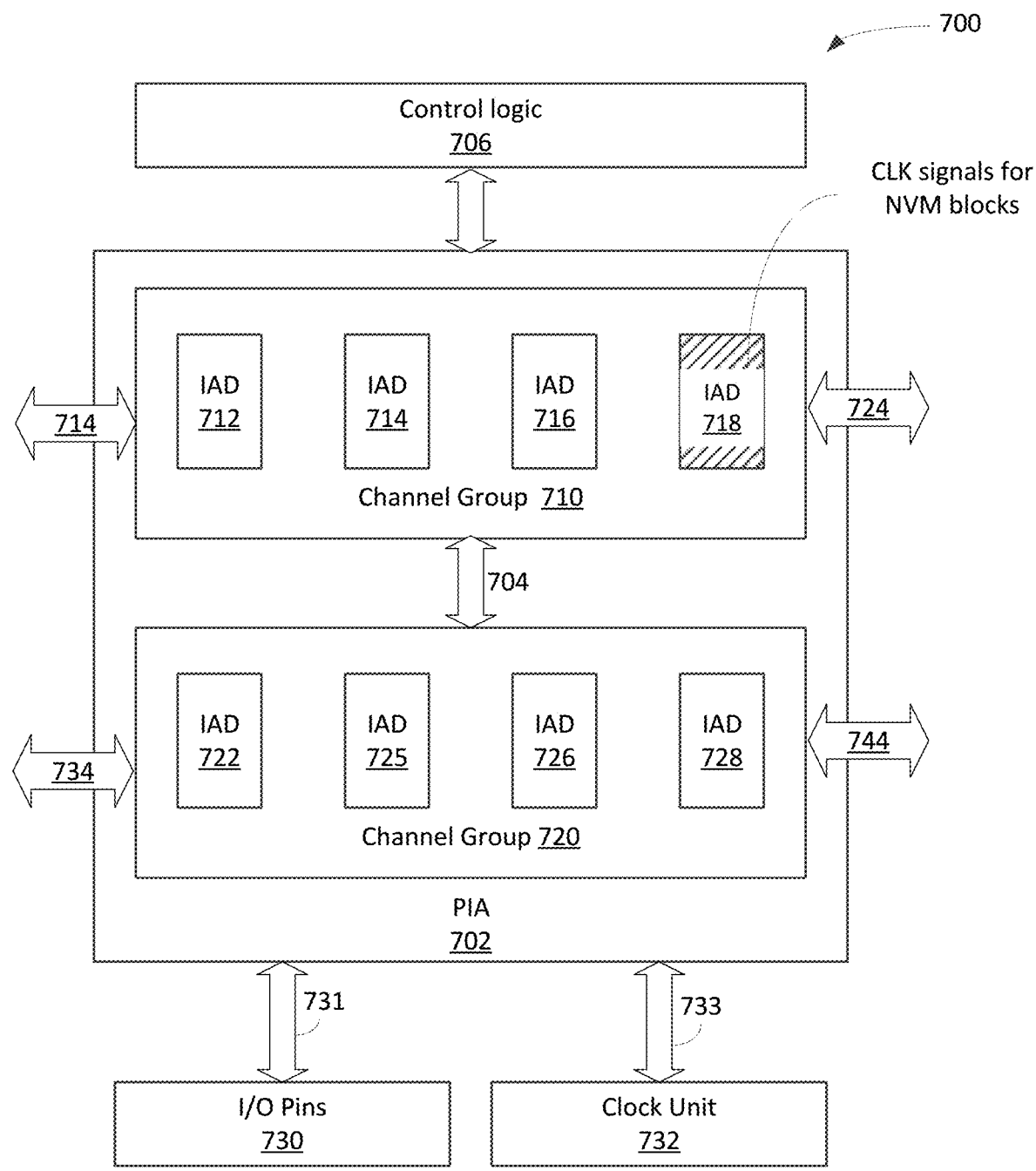

FIG. 7 is a block diagram 700 illustrating a routing logic or routing fabric containing programmable interconnection arrays capable of routing data and/or clock signals for facilitating low-power operations in accordance with one embodiment of the present invention. Diagram 700 includes control logic 706, PIA 702, IO pins 730, and clock unit 732. Control logic 706 provides various control functions including channel assignment, differential IO standards, and clock management. Control logic 706 may contain volatile memory, non-volatile memory, and/or a combination of the volatile and nonvolatile memory device for storing information such as configuration data. In one embodiment, control logic 706 is incorporated into PIA 702. It should be noted that the underlying concept of the exemplary embodiment(s) of the present invention would not change if one or more blocks (circuit or elements) were added to or removed from diagram 700.

IO pins 730, connected to PIA 702 via a bus 731, contain many programmable IO pins configured to receive and/or transmit signals to external devices. Each programmable IO pin, for instance, can be configured to input, output, and/or bi-directional pin. Depending on the applications, IO pins 730 may be incorporated into control logic 706.

Clock unit 732, in one example, connected to PIA 702 via a bus 733, receives various clock signals from other components, such as a clock tree circuit or a global clock oscillator. Clock unit 732, in one instance, generates clock signals in response to system clocks as well as reference clocks for implementing IO communications. Depending on the applications, clock unit 732, for example, provides clock signals to PIA 702 including reference clock(s).

PIA 702, in one aspect, is organized into an array scheme including channel groups 710 and 720, bus 704, and IO buses 714, 724, 734, 744. Channel groups 710, 720 are used to facilitate routing information between LBs based on PIA configurations. Channel groups can also communicate with each other via internal buses or connections such as bus 704. Channel group 710 further includes interconnecting array decoders ("IADs") 712-718. Channel group 720 includes four IADs 722-728. A function of IAD is to provide configurable routing resources for data transmission.

IAD such as IAD 712 includes routing multiplexers or selectors for routing signals between IO pins, feedback outputs, and/or LAB inputs to reach their destinations. For example, an IAD can include up to 36 multiplexers which can be laid out in four banks wherein each bank contains nine rows of multiplexers. It should be noted that the number of IADs within each channel group is a function of the number of LEs within the LAB.

PIA 702, in one embodiment, designates a special IAD such as IAD 718 for facilitating data transmission as well as clock signals for LMB based memory blocks.

Systems and Network Systems

Figure 8:
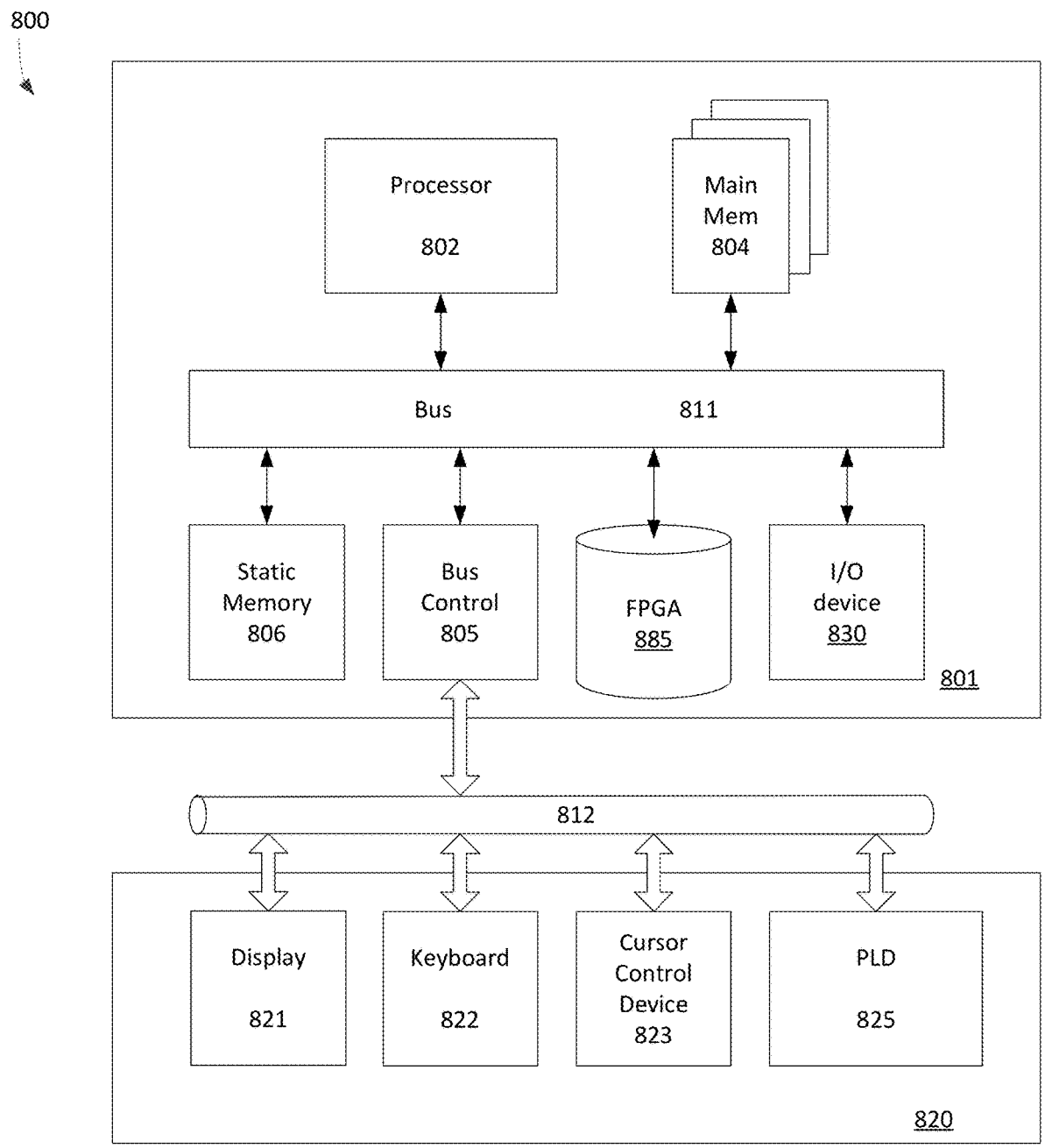
FIG. 8 is a diagram illustrating a system or computer using PSD employing LMBs in accordance with one embodiment of the present invention.

FIG. 8 is a diagram 800 illustrating a system or computer using PSD with low-power operation via application of LMBs in accordance with one embodiment of the present invention. Computer system 800 includes a processing unit 801, an interface bus 812, and an input/output ("IO") unit 820. Processing unit 801 includes a processor 802, main memory 804, system bus 811, static memory device 806, bus control unit 805, IO element 830, and FPGA 885. It should be noted that the underlying concept of the exemplary embodiment(s) of the present invention would not change if one or more blocks (circuit or elements) were added to or removed from FIG. 8.

Bus 811 is used to transmit information between various components and processor 802 for data processing. Processor 802 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 804, which may include multiple levels of cache memories, stores frequently used data and instructions. Main memory 804 may be RAM (random access memory), MRAM (magnetic RAM), or flash memory. Static memory 806 may be a ROM (read-only memory), which is coupled to bus 811, for storing static information and/or instructions. Bus control unit 805 is coupled to buses 811-812 and controls which component, such as main memory 804 or processor 802, can use the bus. Bus control unit 805 manages the communications between bus 811 and bus 812. Mass storage memory or SSD which may be a magnetic disk, an optical disk, hard disk drive, floppy disk, CD-ROM, and/or flash memories are used for storing large amounts of data.

IO unit 820, in one embodiment, includes a display 821, keyboard 822, cursor control device 823, and low-power PLD 825. Display device 821 may be a liquid crystal device, cathode ray tube ("CRT"), touch-screen display, or other suitable display devices. Display 821 projects or displays images of a graphical planning board. Keyboard 822 may be a conventional alphanumeric input device for communicating information between computer system 800 and computer operator(s). Another type of user input device is cursor control device 823, such as a conventional mouse, touch mouse, trackball, or other types of the cursor for communicating information between system 800 and user(s).

PLD 825 is coupled to bus 812 for providing configurable logic functions to local as well as remote computers or servers through a wide-area network. PLD 825 and/or FPGA 885 are configured to facilitate low-power operation using dual NVM cells of LMBs to improve overall efficiency of FPGA and/or PLD. In one example, PLD 825 may be used in a modem or a network interface device for facilitating communication between computer 800 and the network. Computer system 800 may be coupled to servers via a network infrastructure as illustrated in the following discussion.

Figure 9:
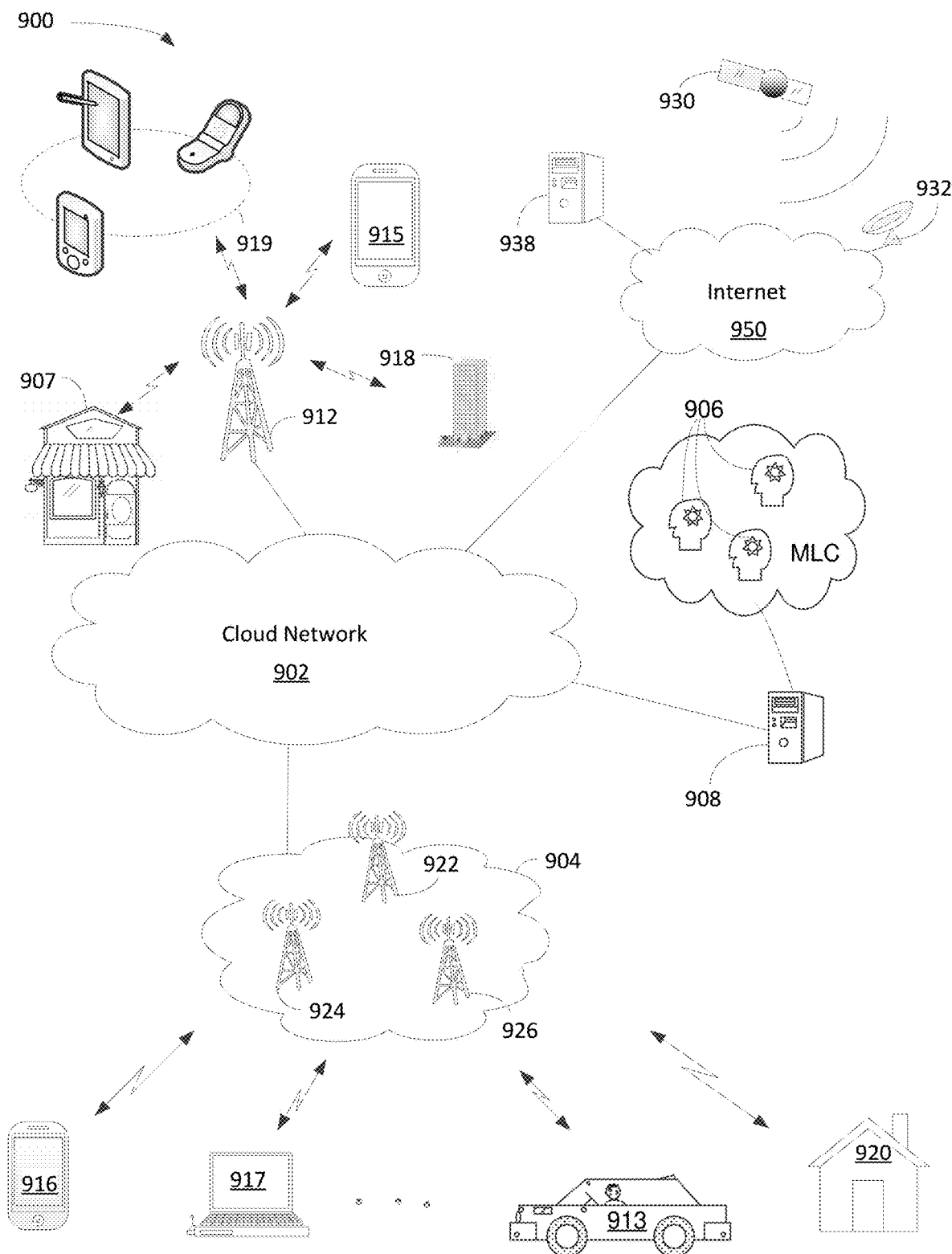
FIG. 9 is a block diagram illustrating a network using PSD (e.g., FPGA, PLD, etc.) utilizing LMBs with two NVM cells in accordance with one embodiment of the present invention.

FIG. 9 is a block diagram 900 illustrating various applications of PSD (e.g., FPGA, PLD, etc.) capable of providing low-power operation using LMBs in accordance with one embodiment of the present invention. Diagram 900 illustrates AI server 908, communication network 902, switching network 904, Internet 950, and portable electric devices 913-919. In one aspect, PSD capable of facilitating UII and/or SDB operation is used in an AI server, portable electric devices, and/or switching network. Network or cloud network 902 can be a wide area network, metropolitan area network ("MAN"), local area network ("LAN"), satellite/terrestrial network, or a combination of a wide-area network, MAN, and LAN. It should be noted that the underlying concept of the exemplary embodiment(s) of the present invention would not change if one or more blocks (or networks) were added to or removed from diagram 900.

Network 902 includes multiple network nodes, not shown in FIG. 9, wherein each node may include mobility management entity ("MME"), radio network controller ("RNC"), serving gateway ("S-GW"), packet data network gateway ("P-GW"), or Home Agent to provide various network functions. Network 902 is coupled to Internet 950, AI server 908, base station 912, and switching network 904. Server 908, in one embodiment, includes machine learning computers ("MLC") 906.

Switching network 904, which can be referred to as packet core network, includes cell sites 922-926 capable of providing radio access communication, such as 3G ($3^{rd}$ generation), 4G, or 5G cellular networks. Switching network 904, in one example, includes IP and/or Multiprotocol Label Switching ("MPLS") based network capable of operating at a layer of Open Systems Interconnection Basic Reference Model ("OSI model") for information transfer between clients and network servers. In one embodiment, switching network 904 logically couples multiple users and/or mobiles 916-920 across a geographic area via cellular and/or wireless networks. It should be noted that the geographic area may refer to campus, city, metropolitan area, country, continent, or the like.

Base station 912, also known as cell-site, node B, or eNodeB, includes a radio tower capable of coupling to various user equipments ("UEs") and/or electrical user equipments ("EUEs"). The term UEs and EUEs are referring to similar portable devices, and can be used interchangeably. For example, UEs or PEDs can be cellular phone 915, laptop computer 917, iPhone® 916, tablets, and/or iPad® 919 via wireless communications. A handheld device can also be a smartphone, such as iPhone®, BlackBerry®, Android®, and so on. Base station 912, in one example, facilitates network communication between mobile devices such as portable handheld device 913-919 via wired and wireless communications networks. It should be noted that base station 912 may include additional radio towers as well as other land switching circuitry.

Internet 950 is a computing network using Transmission Control Protocol/Internet Protocol ("TCP/IP") to provide linkage between geographically separated devices for communication. Internet 950, in one example, couples to supplier server 938 and satellite network 930 via satellite receiver 932. Satellite network 930, in one example, can provide many functions as wireless communication as well as a global positioning system ("GPS"). It should be noted that the UII and/or SDB operation enhancing efficiency of FPGA can benefit many applications, such as but not limited to, smartphones 913-919, satellite network 930, automobiles 913, AI servers 908, business 907, and homes 920.

The exemplary embodiment of the present invention includes various processing steps, which will be described below. The steps of the embodiment may be embodied in machine or computer-executable instructions. The instructions can be used to cause a general-purpose or special-purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 10:
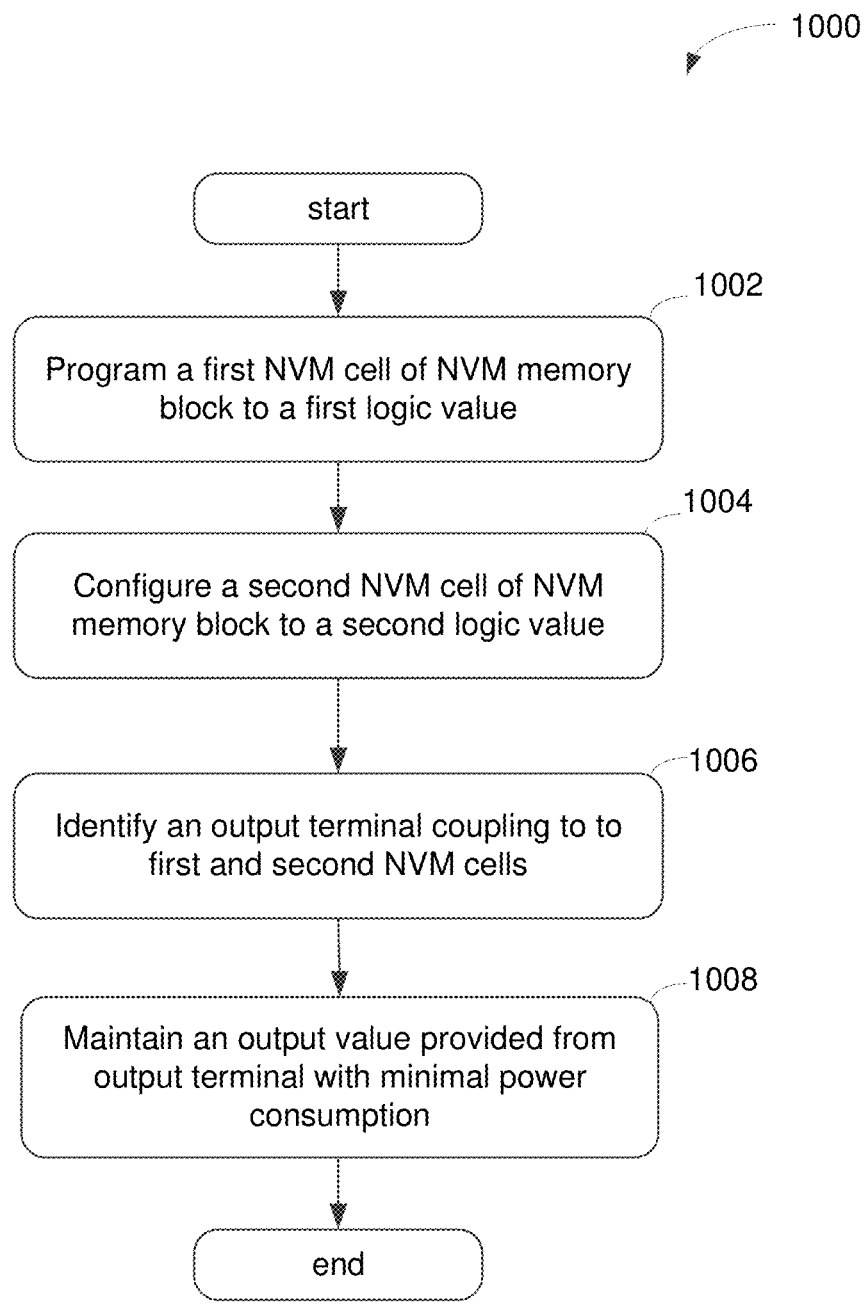
FIG. 10 is a flowchart illustrating a process of storing or maintaining one (1) bit information using two NVM cells in accordance with one embodiment of the present invention.

FIG. 10 is a flowchart 1000 illustrating a process of storing or maintaining one (1) bit information using two NVM cells in accordance with one embodiment of the present invention. At block 1002, the process for storing digital information in a configurable device such as FPGA via LMB using NVM cells can program a first NVM cell of an NVM memory block or LMB to persistently contain a first logic value in accordance with an input signal. In one example, a second logic value which represents opposite logic value of the first logic value is identified or obtained.

At block 1004, a second NVM cell of the NVM memory block or LMB is configured storing the second logic value persistently in accordance with the input signal.

At block 1006, the process is capable of identifying an output terminal of the NVM memory block or LMB which is coupling to the first and second NVM cells.

At block 1008, an output value is provided and/or maintained at the output terminal with minimal power consumption. In one embodiment, the process can generate an output value in response to the first logic value and/or the second logic value. The process is capable of storing configuration data to NVM blocks or LMBs for configuring FPGA.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A device for providing logic operation utilizing low-power memory blocks ("LMBs") for power conservation comprising:
    a first nonvolatile memory ("NVM") cell containing an NVM transistor able to store one (1) bit of first value persistently;
    a second NVM cell coupled to the first NVM cell and configured to persistently store one (1) bit of second value which is opposite logic value of the first value; and
    an LMB output terminal coupled to a drain terminal of first NVM cell and a source terminal of second NVM cell and operable to provide an output value in accordance with the first value.

2. The device of claim 1, wherein the first NVM cell is a flash-based transistor able to store data persistently.

3. The device of claim 1, wherein the first NVM cell is a magnetoresistive random access memory ("MRAM") based transistor able to store data persistently.

4. The device of claim 1, wherein the first NVM cell is a phase-change memory ("PCM") based transistor able to store data persistently.

5. The device of claim 1, wherein the first NVM cell is a ferroelectric RAM ("FeRAM") based transistor able to store data persistently.

6. The device of claim 1, wherein the first NVM cell is a resistive random-access memory ("RRAM") based transistor able to store data persistently.

7. The device of claim 1, wherein the first NVM cell is a conductive-bridging RAM ("CBRAM") based transistor able to store data persistently.

8. The device of claim 1, wherein the second NVM cell is one of a flash-based transistor, magnetoresistive random access memory ("MRAM") based transistor, phase-change memory based transistor, ferroelectric RAM ("FeRAM") based transistor, resistive random-access memory ("RRAM") based transistor, and conductive-bridging RAM ("CBRAM") based transistor for storing data persistently.

9. The device of claim 1, further comprising a plurality of configurable logic blocks ("LBs") in a field programmable gate array ("FPGA") able to be selectively programmed to perform one or more logic functions, wherein the plurality of configurable LBs includes multiple LMBs for programming at least a portion of the configurable LBs.

10. A system able to provide various digital processing functions and network communications comprising the device of claim 1.

11. A method of storing digital information in a configurable device via a nonvolatile memory ("NVM") block comprising:
    programming a first NVM cell of an NVM memory block to persistently contain a first logic value in accordance with an input signal;
    obtaining a second logic value which represents opposite logic value of the first logic value;
    configuring a second NVM cell of the NVM memory block to persistently contain the second logic value in accordance with the input signal;
    identifying an output terminal of the NVM memory block coupling to the first and second NVM cells; and
    maintaining an output value provided from the output terminal with reduced power consumption.

12. The method of claim 11, further comprising generating the output value in response to the first logic value.

13. The method of claim 11, further comprising generating the output value in response to the second logic value.

14. The method of claim 11, further comprising storing configuration data to a plurality of NVM blocks for configuring a field programmable gate array ("FPGA").

15. A method of facilitating a memory access for stored information in a nonvolatile memory ("NVM") block, comprising:
    storing a logic one (1) value to a first NVM device wherein one terminal of the first NVM device is coupled to Voltage Common Collector ("Vcc") and another terminal of the first NVM device is coupled to an output terminal of the NVM block;
    storing a logic zero (0) value to a second NVM device wherein one terminal of the second NVM device is coupled to a ground voltage ("GND") and another terminal of the second NVM device is coupled to the output terminal; and
    providing a logic one (1) output value at the output terminal of the NVM block with reduced current flowing through from the first NVM device to the second NVM device.

16. The method of claim 15, further comprising generating the output value in response to logic value storing in the first NVM device.

17. The method of claim 15, further comprising generating the output value in response to logic value storing in the second NVM device.

18. The method of claim 15, further comprising storing configuration data to a plurality of NVM blocks for configuring a field programmable gate array ("FPGA").

19. A method of facilitating a memory access for stored information in a dual-devices in a nonvolatile memory ("NVM") block, comprising:
    storing a logic zero (0) value to a first NVM device wherein one terminal of the first NVM device is coupled to Voltage Common Collector ("Vcc") and another terminal of the first NVM device is coupled to an output terminal of the dual-devices;

storing a logic one (1) value to a second NVM device wherein one terminal of the second NVM device is coupled to a ground voltage ("GND") and another terminal of the second NVM device is coupled to the output terminal; and providing a logic zero (0) output value at the output terminal of the NVM block with reduced zero current flowing through from the first NVM device to the second NVM device.

20. The method of claim 19, further comprising storing configuration data to a plurality of NVM blocks for configuring a field programmable gate array ("FPGA").

* * * * *